United States Patent
Baumann et al.

(10) Patent No.: US 10,414,075 B2
(45) Date of Patent: Sep. 17, 2019

(54) DEVICE FOR MANUFACTURING INNER TRIM ELEMENTS

(71) Applicant: Faurecia Innenraum Systeme GmbH, Hagenbach (DE)

(72) Inventors: Bernhard Baumann, Lustadt (DE); Hugo Bonvalet, Karlsruhe (DE); Othmane Faik, La Wantzenau (FR); Lionel Hafer, Saint-Jean Rohrbach (FR); Alain Julien, Etupes (FR); Jean Ruiz, Scheibenhard (FR); Michael Walter, Karlsruhe (DE)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 267 days.

(21) Appl. No.: 15/447,035

(22) Filed: Mar. 1, 2017

(65) Prior Publication Data
US 2017/0252951 A1    Sep. 7, 2017

(30) Foreign Application Priority Data

Mar. 2, 2016 (DE) ................... 10 2016 203 402

(51) Int. Cl.
*B29C 44/12* (2006.01)
*B29C 44/18* (2006.01)
(Continued)

(52) U.S. Cl.
CPC ...... *B29C 44/1219* (2013.01); *B29C 44/1228* (2013.01); *B29C 44/18* (2013.01);
(Continued)

(58) Field of Classification Search
CPC . B29C 44/1219; B29C 44/1228; B29C 44/18; B29C 44/586; B29C 44/588; B29L 2031/3041
See application file for complete search history.

(56) References Cited

U.S. PATENT DOCUMENTS 2,290,510 A * 7/1942 Anton ................. B29C 33/10
249/141
3,989,328 A * 11/1976 Nonomaque ......... F25D 23/064
312/406.2

(Continued)

FOREIGN PATENT DOCUMENTS

DE          200 21 270 U1    3/2001
DE     10 2007 035 386 A1    1/2009
DE     20 2010 012 729 U1    9/2011

*Primary Examiner* — Robert B Davis
(74) *Attorney, Agent, or Firm* — Brinks Gilson & Lione

(57) ABSTRACT

A device for manufacturing inner trim elements which are formed by a rigid carrier and a cover layer, between which elements a polymer foam layer is arranged. The carrier is fixable on a first molding tool element, and the cover layer is fixable between the outer edge of the first molding tool element and the outer edge of a second molding tool element. In the molding tool, a cavity is formed between the carrier and the cover layer, wherein a foamable polymer is introducible into the cavity via at least one through-hole which is formed in the carrier and the first molding tool element. The distance between the first and the second molding tool element is enlargeable during the foaming process. At least one through-hole for an escape of air and reactively formed gases out of the cavity is formed in the carrier and in the first molding tool element.

8 Claims, 3 Drawing Sheets

(51) Int. Cl.
*B29C 44/58* (2006.01)
*B29C 45/04* (2006.01)
B29L 31/30 (2006.01)
B29K 75/00 (2006.01)

(52) U.S. Cl.
CPC .......... *B29C 44/586* (2013.01); *B29C 44/588* (2013.01); *B29C 45/04* (2013.01); *B29K 2075/00* (2013.01); *B29L 2031/3005* (2013.01); *B29L 2031/3041* (2013.01)

(56) References Cited

U.S. PATENT DOCUMENTS

| | | | |
|---|---|---|---|
| 2003/0161989 A1* | 8/2003 | Funakoshi | B29C 44/12 428/71 |
| 2006/0049536 A1* | 3/2006 | Keesler | B29C 33/10 264/39 |
| 2010/0127417 A1 | 5/2010 | Liebmann | |

* cited by examiner

DEVICE FOR MANUFACTURING INNER TRIM ELEMENTS

CROSS-REFERENCE TO RELATED APPLICATIONS

This application claims priority under 35 USC § 119 to German Patent Application No. 10 2016 203 402.2, filed Mar. 2, 2016.

DETAILED DESCRIPTION

Figure 1:
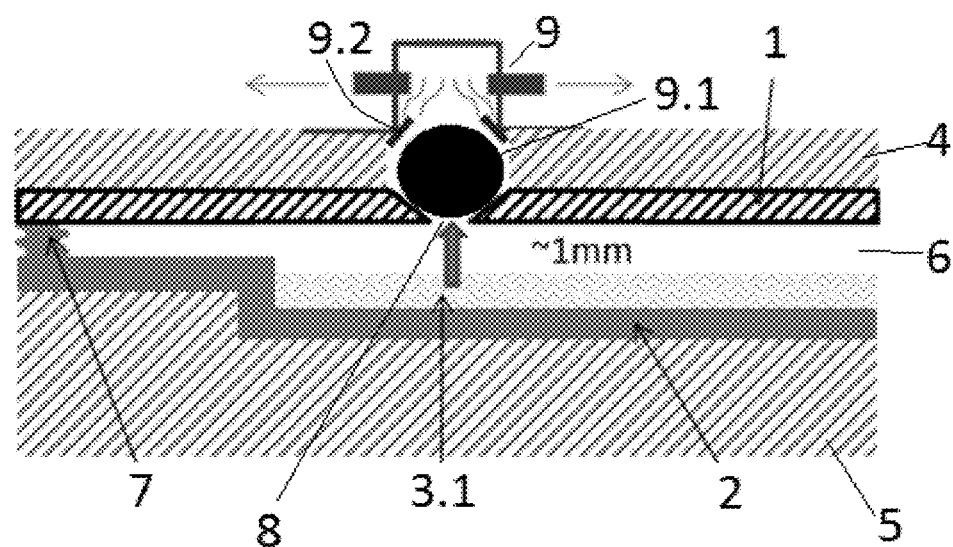
FIG. 1 is a sectioned part-view of one example of a device according to the invention, with which a carrier and a cover layer are received in a moulding tool, before the foaming process.

The invention relates to a device for manufacturing inner trim elements formed by a carrier and a cover layer, between which a polymer foam layer is arranged. Such inner trim elements can preferably be used in the interior of vehicles, for example as door trims, roof trims or dashboards. Herein, the polymeric foam layer improves the haptics of the preferably decorative cover layer, said cover layer being able to bear on the foam layer due to its deformability. The insulating behaviour can also be improved by way of this. Thickness differences of the cover layer material and which would otherwise remain visible as such can thus also be compensated.

On manufacture, one usually proceeds such that the carrier and the cover layer are inserted or laid into a moulding tool. The moulding tool is herein designed such that a cavity is formed in its inside, between the carrier and the cover layer, into which cavity a foamable polymer is introduced via a suitable filling system, preferably through the moulding tool half, on which the carrier, mostly a rigid carrier bears. The foaming process of the polymer is initiated by way of an input of energy, in particular a heating-up and/or the additional feed of a foaming agent. The foaming process can also be initiated with several chemical compounds which chemically react with one another, and herein gases are formed, said gases effecting a foaming. Herein, at least two chemical compounds, for example a multi-functional isocyanate (at least bi-functional) and a multi-functional polyol (at least bi-functional) can be used. The foaming process should be maintained for so long, until the cavity between the carrier and the cover layer is filled out. Due to the volume increase of the polymer on foaming and the gaseous reaction products which herein occur, it is necessary to remove these gaseous reaction products and air from the inside of the moulding tool and from the inner trim element, at least to a very significant extent.

Here, it is a problem that foaming polymer also escapes from the cavity, if air and gaseous reaction products can escape to the outside via at least one through-hole. It is particularly critical when too large a quantity of such polymer escapes. However, even smaller amounts lead to an increased post-machining effort, due to the fact that these also need to be removed.

It is therefore the object of the invention, to specify possibilities for an adequate venting during the foaming process, with which the cavity is filled out with foam, and for a reliable sealing as well as for the prevention of an undesirable exit of foamed polymer, wherein such possibilities should additionally be able to be simply realised.

With the device according to the invention, the carrier can be fixed to a first moulding tool element, and the cover layer to a second moulding tool element which lies opposite the first moulding tool element. The fixation can be achieved by a positive fit. A cavity, into which a foamable polymer is introduced, is formed between the carrier and the cover layer, in the moulding tool which is formed by the first and the second moulding tool element. The foamable polymer can e.g. be introduced via a further through-hole in the first moulding tool element.

The distance between the first and the second moulding tool element is increased during the foaming process, so that the cavity likewise enlarges during the foaming process. A correspondingly larger volume and in particular a greater thickness of the formed polymeric foam layer can be achieved by way of this, and the quantity of air to be removed from the cavity can simultaneously be reduced. An improved pre-distribution with the injection moulding procedure of the polymer to be foamed can be achieved by way of this.

Before the beginning of the foaming process, the cavity should have a smaller volume, into which the still fluid polymer to be foamed can be filled in. The volume should herein be preferably selected such that the cavity can be filled by the fluid polymer to an at least approximately complete extent. It is only from the beginning of the foaming process that the volume of the cavity should be enlarged by way of increasing the distance of the two moulding tool elements.

At least one through-hole for an escape of air and gaseous reaction products reactively formed during the foaming process, out of the cavity, is formed in the carrier and in the first moulding tool element.

The through-hole(s) is/are designed such that an exit of polymer can be prevented by a self-closure effect of the through-hole(s) and/or by an intermediate layer arranged between the carrier and the first moulding tool element, by way of the polymer, or at least a temporary closure of the through-holes(s) can be achieved by a closure element or by a valve device, after the escape of air and gaseous reaction products.

A sealing element which radially encloses the cavity and which prevents air and/or gaseous reaction products from escaping between the outer edges of the carrier and cover layer can be present between the outer edges of the carrier and the cover layer.

The closure of the through-hole can be achieved with valve elements which are known per se, such as a check valve for example. Such valves should be designed such that air and gaseous reaction products can escape out of the cavity to an almost complete extent. However, if polymeric material gets into the region of the further through-holes, then these should be able to be closed.

Advantageously, a vacuum which assists the exit of air and gaseous reaction products should be able to be maintained in the region of the outwardly facing opening(s) of the through-hole(s), preferably outside the first moulding tool element, by way of a device producing the vacuum. This can be achieved with a compressor or also whilst utilising the Venturi effect. Air and gaseous reaction products can be led away out of the region outside the moulding tool to an improved extent and in a targeted manner by way of this.

On manufacture of inner trim elements, one can proceed such that a carrier and a cover layer are inserted into a moulding tool such that the carrier comes to bear on a first moulding tool element, and the cover layer on a second moulding tool element. A cavity is thus formed between the carrier and the cover layer. At least the cover layer can herein be held between the two moulding tool elements in a clamped manner.

A polymer which is suitable for foaming or one or more components which lead to a foam, can subsequently be fed into the cavity, through openings formed in the first moulding tool element and the carrier. A foaming process of the components chemically reacting with one another or a foaming process of the polymer by way of an energy input and/or by way of a feed of foaming agent can subsequently be initiated. Herein, the distance between the moulding tool elements and the simultaneously the volume of the cavity are increased. The air which is contained in the cavity and gaseous reaction products formed with the foaming process can escape to the outside by way of the at least one through-hole which is led through the carrier and the first moulding tool element as well as an intermediate layer which is present as the case may be. The air and reaction gases are herein displaced out of the cavity as a result of the volume increase of the foaming polymer.

The through-hole(s) should be closed as shortly as possible before the complete escape of air and the gaseous reaction products, in order to prevent an escape of polymer out of the cavity. However, the closure should be achieved such that, if at all, only a very small quantity of polymer can get outside the cavity and then over the outwardly facing surface of the carrier.

Alternative possibilities concerning this are to be explained hereinafter.

Thus a valve device formed by a sealing-off element which in the region of the opening of the respective through-hole is arranged in a movable manner in the outflow direction, and by a sealing element arranged thereabove, can thus be arranged above an outwardly facing opening of a through-hole. The outflow direction is the direction of the out-flowing air and/or of the gaseous reaction products, thus the direction from within the cavity to the outside. Herein, a sealing-off element can be a ball, a cone-shaped element or a truncated-come-shaped element, and the sealing element can be an annulus-shaped sealing element. The sealing element can be closed by way of a suitable movement of the sealing-off element. Thus a ball, a cone-shaped element or a truncated cone-shaped element can close the inside of a bore of a sealing element. The movement should be effected in a guide, in order to prevent a lateral movement of the sealing-off element.

Advantageously, a sealing element should have an intrinsic mass which permits an escape of air and gaseous reaction products by way of a movement of the sealing-off element, which leads to the release of the opening of the respective through-hole. Herein, the movement of the sealing-off element can be achieved as a result of the air and gaseous reaction products, which flow out of the cavity. This movement can be assisted by a vacuum which is maintained above the opening. The removal of air and reactively formed gases from the environment of the moulding tool can be assisted in a targeted manner, by way of a vacuum which is set there. Advantageously, the sealing-off element should be arranged vertically, by which means the gravitational force acts upon the sealing-off element in the direction of the through-hole in the moulding tool element. The intrinsic mass of the sealing-off element however, whilst taking into account the free cross section of the outer opening of the through-hole(s) and the volume flow of the exiting air and gaseous reaction products, should be so large than an automatic limitation of the movement of the sealing-off element is achieved, and the sealing-off element is prevented from closing the sealing element before an exit of polymer out of the cavity occurs. The undesirable premature closure of the respective through-hole can also be avoided by way of the application of a valve which is not completely closed given an only slight vacuum or even no vacuum at all and which lets through air and/or gaseous reaction products during the foaming process.

A sealing-off element should be designed such that it can be moved against the sealing seat of the sealing element by way of polymer exiting from the cavity, and herein closes the opening of the sealing element.

During the foaming process, the two moulding tool elements should be moved so far apart, than an adequate inner volume increase between the carrier and the cover layer is achieved and the cavity between the carrier and the cover layer can herein be at least approximately completely filled with the foamed polymer.

Filling devices which are know per se and which preferably permit a metering can be applied for introducing the polymer.

All materials which are known per se for the manufacture of inner trim elements, in particular for the carrier, the cover layer and the foam can be applied with the invention.

The invention is hereinafter described in more detail by way of example.

It is clear from the part-view of an example of the device according to the invention and which is shown in a sectioned representation in FIG. 1, as to how a cover layer 2 bears on an inner surface of a second moulding tool element 5, and a carrier 1 of rigid plastic on the inner surface of a first moulding tool element 4. A cavity 6 is formed between the carrier 1 and the cover layer 2. A foamable polymer 3.1 was brought into the cavity 6. Herein, the introduced polymer volume was selected such that the cavity 6 has been completely filled out by the polymeric foam layer 3 after the complete foaming of the polymer. This should be carried out whilst taking into account the movement of at least one of the moulding tool elements 4 or 5, in this case of the first moulding tool element 4, which is indicated with the arrows and leads to an enlargement of the cavity volume.

With the represented example, a sealing element 7 which is formed over the entire outer periphery of the cover layer 2 is arranged on the outer edge of the cover layer 2. With this example, the sealing element 7 is formed from a flexible, deformable polymer.

Through-holes 8, of which only one is represented, are formed in the first moulding tool element 4 and the carrier 1. A valve device 9 is present in each case at the through-holes 8. With this example, the valve device is formed by a ball as a sealing-off element 9.1 and by an annulus-shaped sealing element 9.2, and these are arranged in a housing. The ball as the sealing-off element 9.1 has an intrinsic mass which, as a result of the increased pressure acting in the moulding tool during the foaming process and of the outflow of air and reactively formed gases, permits this ball 9.1 to be lifted to the extent that air and reactively formed gases can escape through the further through-holes 8, and that the ball 9.1 does not herein bear on the sealing element 9.2, so that the air and reactively formed gases can escape through the sealing element 9.2 to the outside. The escape of the air and of the gases which are reactively formed on foaming can be transported by a vacuum acting at the valve device 9, as is indicated with the arrows. The vacuum can preferably be achieved by the Venturi effect.

Figure 2:
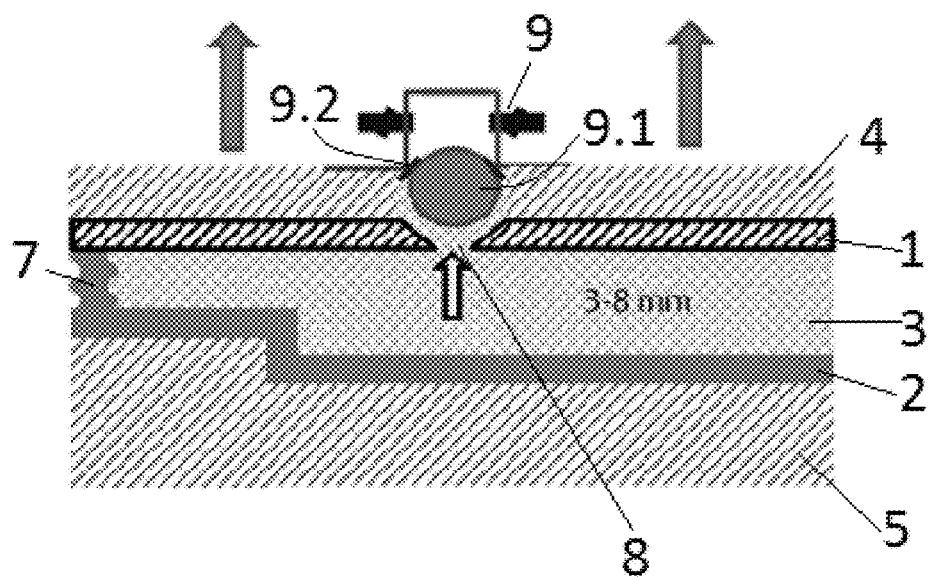
FIG. 2 illustrates the example shown in FIG. 1, during the foaming process.

In FIG. 2, it is shown that the first moulding tool element 4 is lifted during the foaming process, as has been rendered evident by the vertically directed arrows. The inner volume which is to be filled with the polymeric foam layer 3 enlarges by way of this. If foaming polymer gets through a further through-hole 8 and hits the ball 9.1 during the foaming process, then this ball is moved against the sealing element 9.2 and the valve device 9 is closed on account of this, so that no polymer can exit. For this, the sealing element can preferably have a conically designed, annular sealing surface which should be matched to the outer radius of the ball 9.1. However, a sealing-off element 9.1 can also be designed in a cone-shaped or truncated-cone-shaped manner and be introduced with the conically tapering part into the opening of the sealing element 9.2, for the complete sealing.

FIG. 2 shows how the sealing-off element 9.1 is displaced by the polymer 3.1 exiting through the through opening 8 and by way of this is moved against the sealing element 9.2 and pressed, so that the valve device 9 is completely closed, after the at least almost complete escape of air and the reactively formed gases. An undesired exit of polymer 3.1 can thus be avoided.

Figure 3:
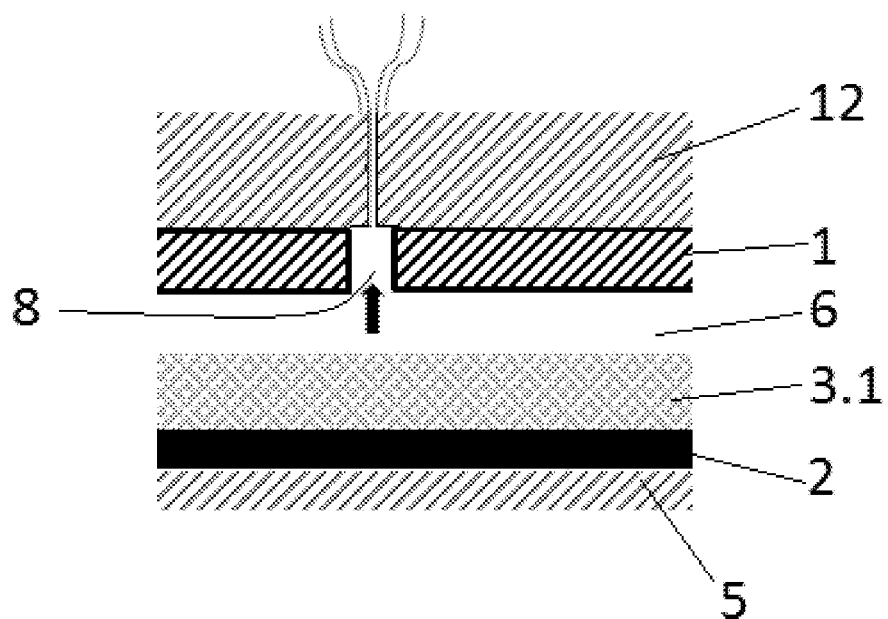
FIG. 3 is a sectioned part-view of a further example, during the exit of air and gaseous reaction products.

FIG. 3 shows how, on account of the displacement of the foaming polymer 3.1, air and other gases can exit out of the cavity 6 to the outside via the through-hole 8 formed by the carrier 1 and the first moulding tool element 4.

If the foamed polymer 3 completely fills the cavity 6, and has displaced at least the major part of the air and reactively formed gases out of the cavity 6, then polymer 3.1 gets into the through-hole 8 and successively fills this. Herein, a self-closing effect can prevent the exit of polymer 3.1 to the outside, by way of polymer curing or polymerising to a sufficient exit within the through-hole 8, so that it is no longer flowable and forms a "plug" as a closure for the through-hole 8.

Figure 4:
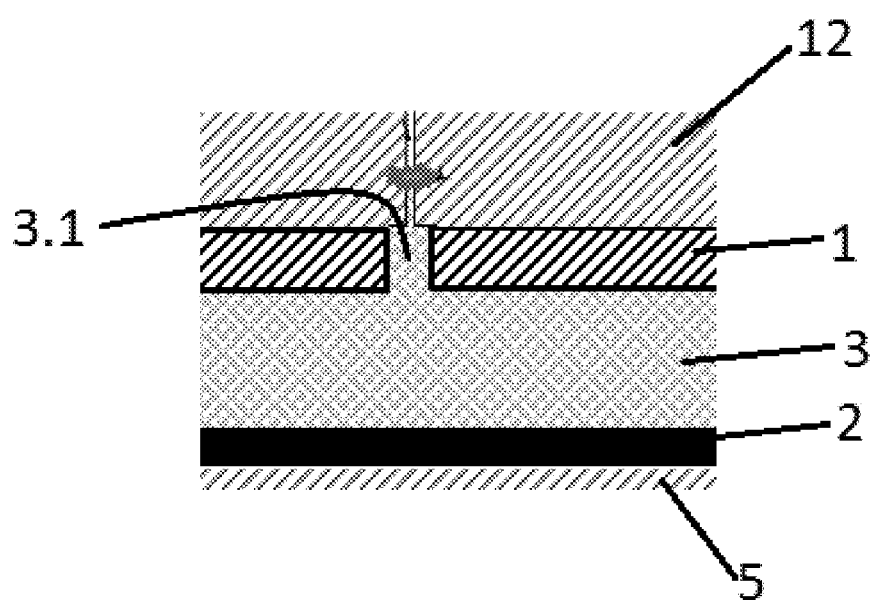
FIG. 4 is a sectioned part-view of the example according to FIG. 3, with a closed through-hole.

However, this can be at least assisted by way of an elastically and/or plastically deformable intermediate layer 12 being able to be arranged between the carrier 1 and the first moulding tool element 4 which is not shown here, as is indicated in the FIGS. 3 and 4. At least one through-hole which is formed in the intermediate layer 12 and which communicates with the through-holes 8 in the carrier 1 and the first moulding tool element 4 is present, for the expulsion of air and gaseous reaction products.

The through-hole and in particular the opening of the through-hole which is arranged at the outer side of the first moulding tool element 4 should have a free cross section, so that entering foam itself can close the through-hole due to its reaction.

However, for example an elastically deformable intermediate layer 12 can also be spanned out or stretched out by way of externally acting tension forces, so that the free cross section of the through-holes which are formed in it enlarge, and an exit of air and other gases is possible. The free cross section of the through-holes which are formed in the intermediate layer 12 can be reduced or these through-holes completely closed, after lifting of the tension force action. This should be effected when polymer exits the cavity 6.

However, the same effect can also be achieved by way of pressing together the intermediate layer 12 from two opposite sides. Herein, the carrier 1 can be pressed against the surface of the first moulding tool element 4 which faces it.

As a result of an elastic and/or plastic deformation which can be achieved in such a manner, the through-holes in the intermediate layer 12 can be closed at least to the extent that polymer 3.1 is largely prevented, but preferably completely prevented from passing through the intermediate layer 12 to the outside.

The representation of the first moulding tool element 4 which is arranged above the intermediate layer 12 as been omitted in the FIGS. 3 and 4.

Figure 5:
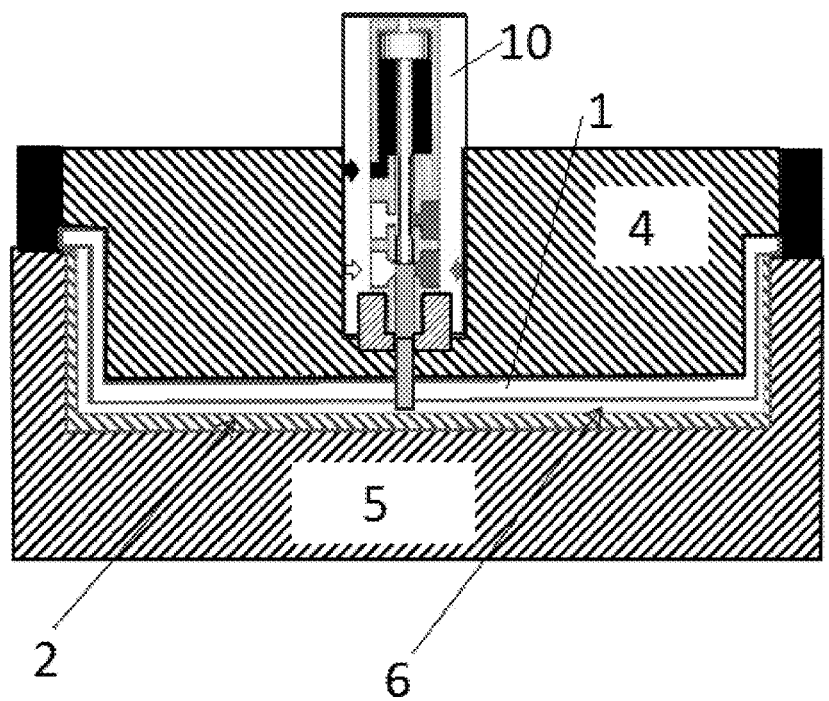
FIG. 5 illustrates a sectioned representation through a moulding tool, with a carrier and a cover layer which are arranged therein, before the filling with foamable polymer and before its foaming.

The moulding tool with the first and the second moulding tool element 4 and 5 is shown in FIG. 5. Again, the carrier 1 and the cover layer 2 are received in the inside of the closed moulding tool, such that a cavity 6 is formed. A filling nozzle of a filling device 10 is led through the first moulding tool element 4 and the carrier 6, up to into the cavity 6. Foamable polymer 3.1 can be brought into the cavity in metered form by way of the filling device 10.

With the foaming process, the volume of the foamable polymer 3.1 enlarges and pores form. The foaming process can be initiated by an input of energy and/or the feed of a foaming agent into the cavity 6.

Figure 6:
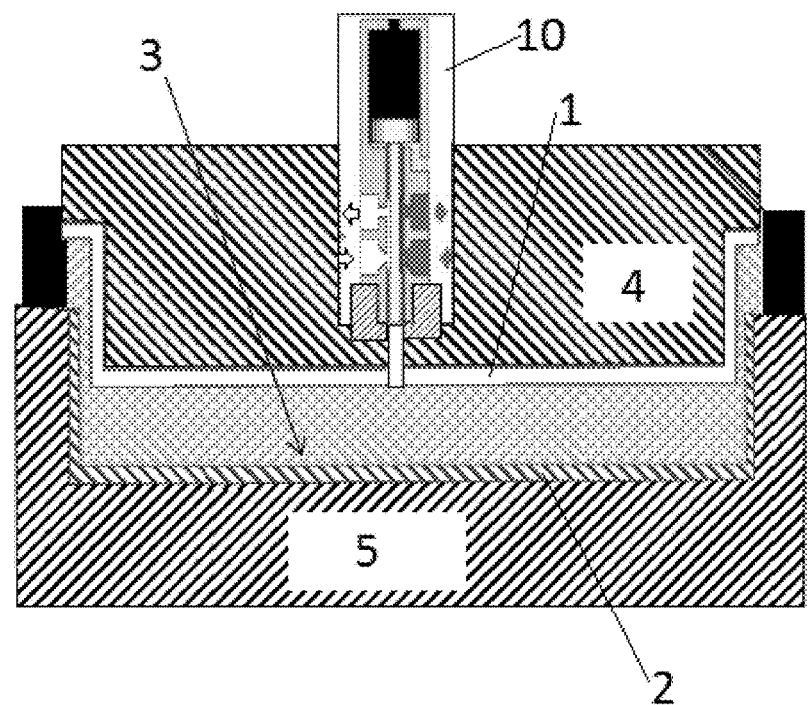
FIG. 6 illustrates a sectioned representation according to FIG. 5, after the foaming of the polymer.

The moulding tool elements 4 and 5 are simultaneously moved apart, so that the cavity 6 which is filled with the foaming polymer enlarges. The foaming process is illustrated by FIG. 6.

LIST OF REFERENCE NUMERALS

1 rigid carrier
2 cover layer
3 polymer foam layer
3.1 foamable polymer
4 first moulding tool element
5 second moulding tool element
6 cavity
7 sealing element
8 opening
9 valve device
9.1 sealing-off element
9.2 sealing element
10 filling device
12 intermediate layer

The invention claimed is:
1. A device for manufacturing inner trim elements which include a carrier and a cover layer, between which a polymer foam layer is arranged, the device comprising a moulding tool which includes a first moulding tool element and a second moulding tool element arranged lying opposite the first moulding tool element; wherein the carrier is fixable on the first moulding tool element, and the cover layer is fixable on the second moulding tool element, a cavity is formed between the carrier and the cover layer, a foamable polymer is introducible into the cavity during a foaming process; and
the distance between the first and the second moulding tool element is enlargeable during the foaming process, so that the cavity enlarges during the foaming process and at least one through-hole is in the carrier and in the first moulding tool element for an escape of air and gaseous reaction products reactively formed during the foaming process, out of the cavity; wherein the through-hole(s) and/or an intermediate layer arranged between the carrier and the first moulding tool element is/are designed such that an exit of polymer is preventable by a self-closure effect of the through-hole(s) by way of the polymer or at least a temporary closure of the through-hole(s) is achievable by a closure element, an intermediate layer or a valve device, the valve device comprising a sealing-off element which is movably arranged in the outflow direction in a region of the opening of the respective through-hole, and by a sealing element which is arranged thereabove, after the escape of air and gaseous reaction products.

2. The device of claim 1, wherein the sealing element is present between the first moulding tool element and the second moulding tool element, said sealing element enclosing the cavity.

3. The device of claim 1, wherein the sealing-off element is a ball, a cone-shaped element, or a truncated-cone-shaped element and the sealing element is an annulus-shaped sealing element.

4. The device of claim 1, wherein the sealing-off element comprises an intrinsic mass which permits the escape of air and gaseous reaction products by way of a movement of the sealing-off element, which leads to an unblocking of the opening of the respective through-hole, wherein the movement of the sealing-off element is achievable as a result of the escape of the air and gaseous reaction products out of the cavity; and the sealing-off element is movable against a sealing seat of the sealing element by way of the polymer exiting from the cavity, which closes the opening of the sealing element.

5. The device of claim 1, wherein the free cross section of the through-holes(s) within the carrier is larger than the free cross section of the through-hole(s) within the first moulding tool element, and/or an offset of the middle longitudinal axis of the through-holes is present in the region of the carrier and of the first moulding tool element, so that a stepped edge region is formed between a surface of the carrier that faces a surface of the first moulding tool element.

6. The device of claim 1, wherein an intermediate layer, which is formed from an elastically and/or plastically deformable material and through which the through-hole(s) is/are led, is present between the carrier and the first moulding tool element, and which, after the escape of air and gaseous reaction products, closes the through-holes(s) on account of an elastic and/or plastic deformation.

7. The device of claim 2, wherein the free cross section of the through-holes(s) within the carrier is larger than the free cross section of the through-hole(s) within the first moulding tool element, and/or an offset of the middle longitudinal axis of the through-hole(s) is present in the region of the carrier and of the first moulding tool element, so that a stepped edge region is formed between a surface of the carrier that faces a surface of the first moulding tool element.

8. The device of claim 2, wherein an intermediate layer; which is formed from an elastically and/or plastically deformable material and through which the through-hole(s) is/are led, is present between the carrier and the first moulding tool element, and which, after the escape of air and gaseous reaction products, closes the through-holes(s) on account of an elastic and/or plastic deformation.

* * * * *